Nov. 17, 1970     J. H. STAEHLIN     3,541,563

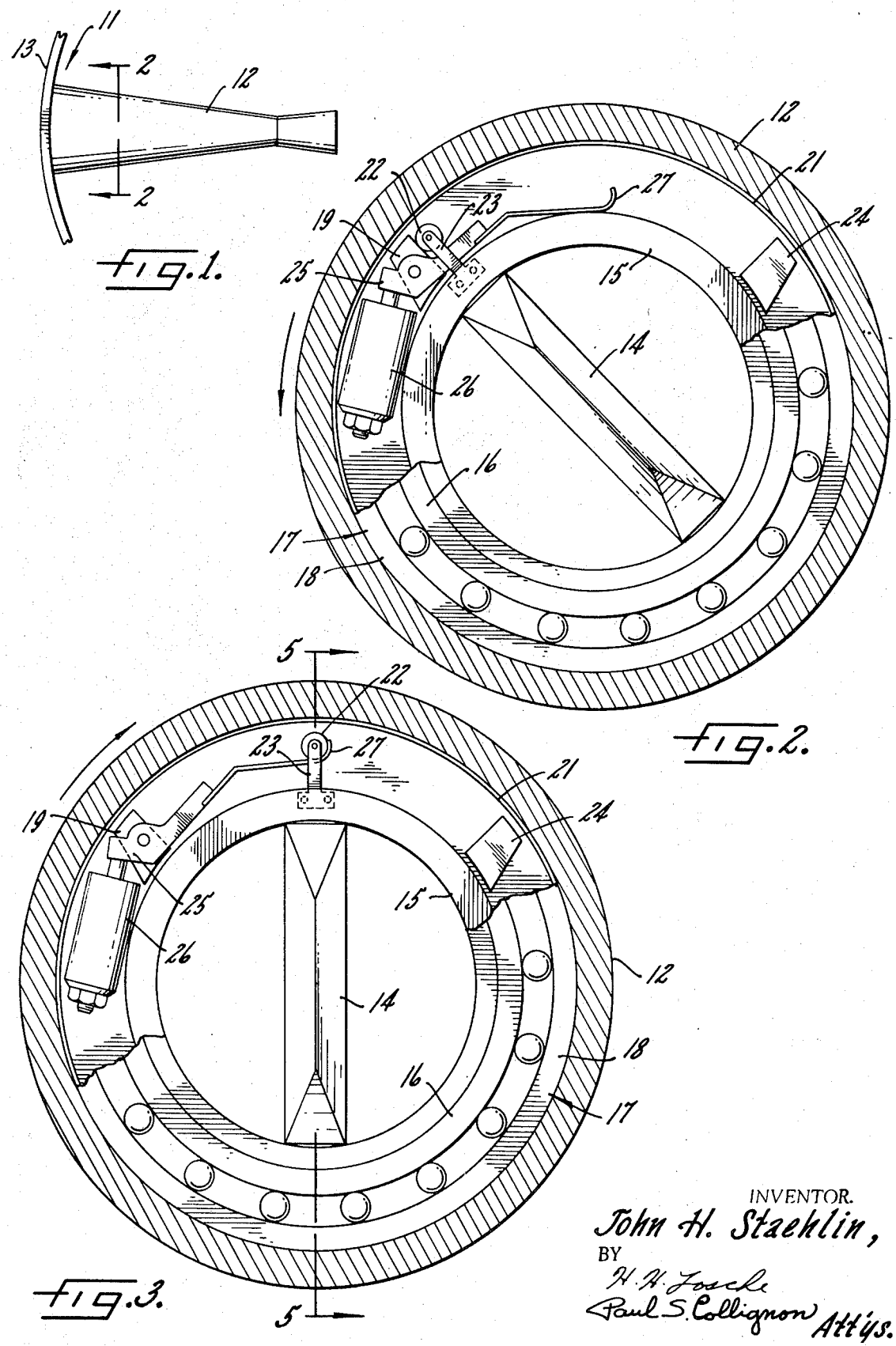

POLARIZATION DEVICE FOR ANTENNA

Filed July 31, 1963     2 Sheets-Sheet 2

INVENTOR.
John H. Staehlin,
BY
H. H. Losche
Paul S. Collignon Att'ys.

Patented Nov. 17, 1970

3,541,563
POLARIZATION DEVICE FOR ANTENNA
John H. Staehlin, Baltimore, Md., assignor, by mesne assignments, to the United States of America as represented by the Secretary of the Navy
Filed July 31, 1963, Ser. No. 300,410
Int. Cl. H01q *15/24, 3/10*
U.S. Cl. 343—766    4 Claims The present invention relates to a radar antenna, and more particularly to apparatus for selectively changing the operation of such antennas to work in either a linear polarization mode, a left-hand circular polarization mode, or a right-hand circular polarization mode.

Many radar systems are designed to operate either in a linear polarization mode or a circular polarization mode. While the normal mode of operation is the linear mode, under some weather conditions, such as heavy rain, there is considerable advantage in using circular polarization. This results from the fact that raindrops, whic hare spherical, reflect circularly polarized waves back as circularly polarized waves that are polarized in the opposite sense, whereas most targets are nonspherical and reflect but a portion of the circularly polarized transmitted waves, the reflected portion being elliptically or linearly polarized.

In addition to having a selection of polarization modes for weather condition, a plurality of modes are also useful in combat operations, as the radar is less susceptible to jamming. It has been proven in actual flight tests that antijamming performance can be enhanced by being able to change to a left-hand circular polarization as well as the commonly used right-hand circular and vertical linear polarizations.

In the present invention a quarter-wave plate is rotatably mounted within a feedhorn that can be rotated either in a clockwise or a counterclockwise direction. With the feedhorn being rotated in a counterclockwise direction, friction between the outer race of a bearing mounting the quarter-wave plate and the inner race causes the quarter-wave plate to be rotated until its housing is stopped by a mechanical stop. In this position, which is referred to as the left-hand circular mode, the quarter-wave plate is positioned diagonally at approximately forty-five degrees to the vertical axis of the feedhorn.

In order to change to a right-hand circular mode, it is merely necessary to change the direction of rotation of the feedhorn. With the feedhorn rotating in a clockwise direction, the quarter-wave plate will be rotated ninety degrees until its housing encounters a second mechanical stop. This position is referred to as the right-hand circular mode.

In order to change from a left-hand circular mode to a linear polarization mode, an electromagnet is energized which, in turn, causes a third stop to be pivoted into position such that it will permit the quarter-wave plate to be rotated only forty-five degrees. The direction of rotation of the feedhorn is then changed to a clockwise direction and the quarter-wave plate is rotated in that direction until its housing is stopped by the third mechanical stop that was previously pivoted into position.

It is therefore a general object of the present invention to provide a radar system with an antenna that will increase the antijamming performance of the radar system.

Another object of the present invention is to provide an antenna that can provide a left-hand circular, a right-hand circular, or a linear mode of polarization.

Still another object of the present invention is to provide an antenna with a plurality of polarization modes that can be switched from a remote position.

Other objects and advantages of the present invention will be readily appreciated as the same becomes better understood by reference to the following detailed description when considered in connection with the accompanying drawings wherein:

FIG. 1 is a side view showing a feedhorn of a radar antenna;

FIG. 2 is a sectional view taken on line 2—2 of FIG. 1 and showing a quarter-wave plate in a left-hand circular polarization mode;

FIG. 3 is a view similar to FIG. 2 only showing a quarter-wave plate in a linear polarization mode;

Figure 4:
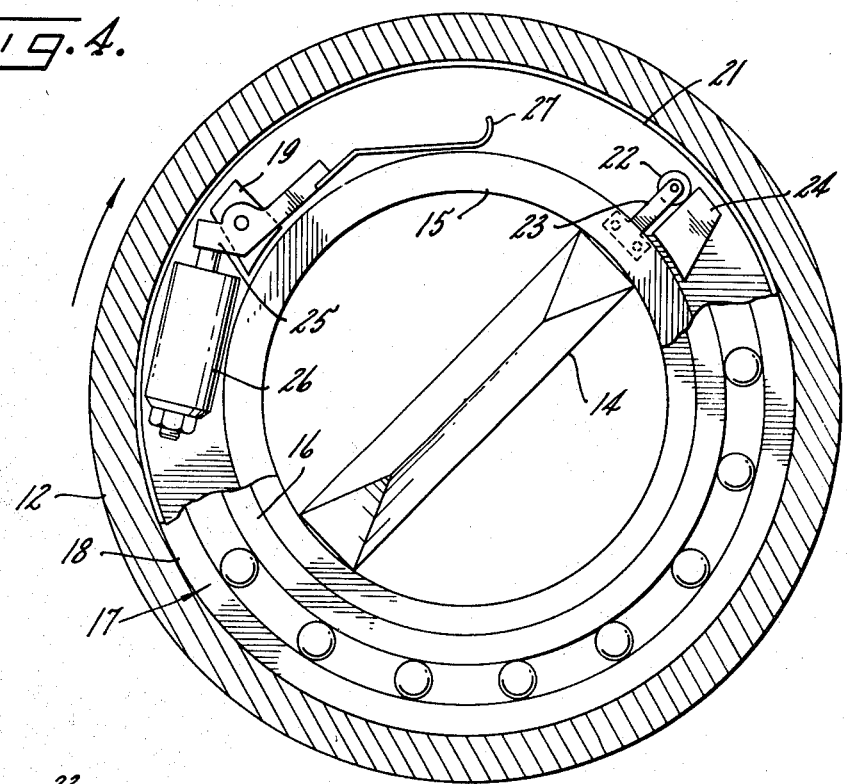
FIG. 4 is a view similar to FIG. 2 only showing a quarter-wave plate in a right-hand circular polarization mode.
Figure 5:
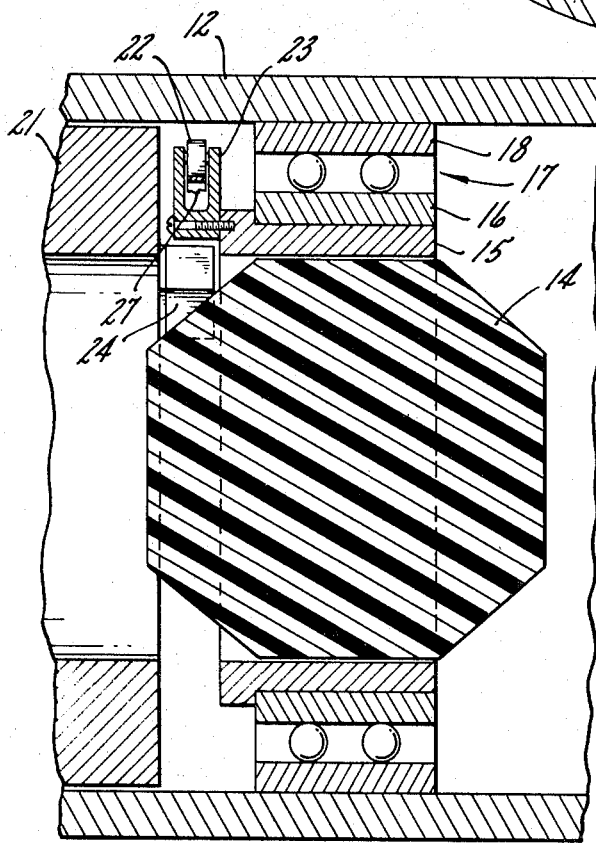
FIG. 5 is a sectional view taken on line 5—5 of FIG. 3.

Referring now to FIG. 1 of the drawings, there is shown a paraboloidal antenna 11 having a feedhorn 12 which is offset from the center axis of a reflector 13. Feedhorn 12 is rotated by a spin motor (not shown). The offset focal point causes r-f energy to be lobed in a pencil-shaped beam about the center axis of reflector 13.

Within the feedhorn 12, as shown in FIGS. 1 through 5 of the drawings, a quarter-wave plate 14 is positioned in a housing 15 which in turn is rotatably mounted in the inner race 16 of a bearing 17. By way of example, the quarter-wave plate 14 might be made of polystyrene. The outer race 18 of bearing 17 is in contact with the inside diameter of feedhorn 12 and rotates with feedhorn 12. A first stop 19 is mounted on plate 21 which is stationarily mounted within feedhorn 12. Stop pin 22, which is attached to housing 15 by means of bracket 23, is positioned such that when it is contacting stop 19 the quarter-wave plate 14 will be positioned at a 45 degree angle to the vertical axis of feedhorn 12. The quarter-wave plate 14 develops a 90 degree delay in the component of the wave parallel to the quarter-wave plate, and the two transmitted sine wave components which have a 90 degree phase difference are then said to be circularly polarized. When stop pin 22 is in contact with stop 19, the polarization mode is designated as left-hand circular polarization. A second stop 24 is attached to plate 21, and when stop pin 22 is in contact with stop 24, the polarization is designated as right-hand circular polarization.

A rocker arm 25 is pivotally attached to stop 19 and is actuated by electromagnet 26, which is attached to plate 21. A stop arm 27 is attached to rocker arm 25, and when rocker arm 25 is actuated by electromagnet 26, stop arm 27 is of sufficient length such that when stop pin 22 engages stop arm 27, the quarter-wave plate 14 will be in parallel alignment with the vertical axis of feedhorn 12. When quarter-wave plate 14 is in this position, the polarization mode is designated as linear polarization. When electromagnet 26 is not energized, stop arm 27 is in a low position which permits stop pin 22 to pass over stop arm 27.

In operation, assuming that feedhorn 12 is rotating in a counterclockwise direction, the outer race 18 of bearing 17 will also rotate in a counterclockwise direction as outer race 18 is press-fitted or otherwise attached to feedhorn 12. Inner race 16 is also caused to rotate in a counterclockwise direction, due to friction, and thus housing 15 and the quarter-wave plate 14 are rotated until stop pin 22 contacts stop 19. At this position, that is, when stop pin 22 contacts stop 19, quarter-wave plate 14 is disposed at an angle fo forty-five degrees to the vertical axis of feedhorn 12. Feedhorn 12 will, however, continue to rotate as there will be relative motion between inner race 16 and outer race 18. This position is referred to as left-hand circular polarization and is shown in FIG. 2 of the drawings.

Assuming now that it is desired to switch to right-hand circular polarization, it is merely necessary to reverse the direction of rotation of the feedhorn 12. With feedhorn 12 rotating in a clockwise direction, outer race 18 will also be rotating in the same direction and the inner race will be driven, by friction, until stop pin 22 strikes stop 24. At this position, the quarter-wave plate will have been rotated ninety degrees from the left-hand circular position, with the quarter-wave plate now being disposed at an angle of forty-five degrees to the vertical axis of feedhorn 12, as shown in FIG. 4 of the drawing.

When it is desired to switch from the left-hand circular polarization mode to a linear polarization mode, electromagnet 26 is first energized which causes rocker arm 25 to pivot and raise stop arm 27. The direction of rotation of feedhorn 12 is then reversed to rotate in a clockwise direction, and stop pin 22 is rotated until it engages stop arm 27. At this position, the quarter-wave plate will have been rotated forty-five degrees from the left-hand circular position, with the quarter-wave plate now being disposde parallel with the vertical axis of feedhorn 12, as shown in FIG. 3 of the drawings. From the linear polarization mode it is possible to shift to either the left-hand circular polarization mode or to the right-hand circular polarization mode. In order to return to the left-hand circular polarization mode it is merely necessary to change the direction of rotation of feedhorn 12. If it is desired to switch from the linear polarization mode to the right-hand circular polarization mode it is merely necessary to de-energize electromagnet 26.

It can thus be seen that the present invention permits selectively changing from various polarization modes to other polarization modes with a minimum of effort and apparatus.

Obviously many modications and vairations of the present invention are possible in the light of the above teachings. It is therefore to be understood, that within the scope of the appended claims, the invention may be practiced otherwise than as specifically described.

What is claimed is:

1. In an antenna system having a rotatable feedhorn, a polarization selector comprising:
    a quarter-wave plate rotatably mounted in said feedhorn,
    a stationary plate mounted within said feedhorn,
    first and second stops attached to said stationary plate, said stops being displaced apart approximately ninety degrees,
    a third stop pivotally attached to said stationary plate for selectively providing a stop midway between said first and second stops,
    means for pivotally actuating said third stop, and
    means connected to said quarter-wave plate for engaging said stops.

2. In an antenna system having a rotatable feedhorn, a polarization selector as set forth in claim 1 wherein said quarter-wave plate is rotatably mounted in a bearing having inner and outer races, said outer race being locked to said rotatable feedhorn.

3. In an antenna system having a rotatable feedhorn, a polarization selector as set forth in claim 1 wherein said means for pivotally actuating said rocker arm comprises an electromagnet.

4. In an antenna system having a rotatable feedhorn, a polarization selector comprising:
    a quarter-wave plate rotatably mounted in said feedhorn,
    first and second stops stationarily mounted relative to said rotatable feedhorn,
    a rocker arm pivotally connected to provide a third stop stationarily mounted relative to said feedhorn,
    an electromagnet for pivotally actuating said rocker arm, and
    means connected to said quarter-wave plate for engaging said stops.

References Cited
UNITED STATES PATENTS

| | | | |
|---|---|---|---|
| 2,594,657 | 4/1952 | Koonz | 200—5 XR |
| 2,588,512 | 10/1958 | Barnett. | |
| 2,906,842 | 9/1959 | Brin | 74—559 |
| 3,216,017 | 11/1965 | Moore | 343—785 XR |

RODNEY D. BENNETT, Primary Examiner

T. H. TUBBESING, Assistant Examiner

U.S. Cl. X.R.

343—100, 783